Jan. 26, 1954
R. J. McCARTHY ET AL
2,667,222
EXTENSIBLE VISOR FOR MOTOR VEHICLES
Filed Oct. 9, 1952
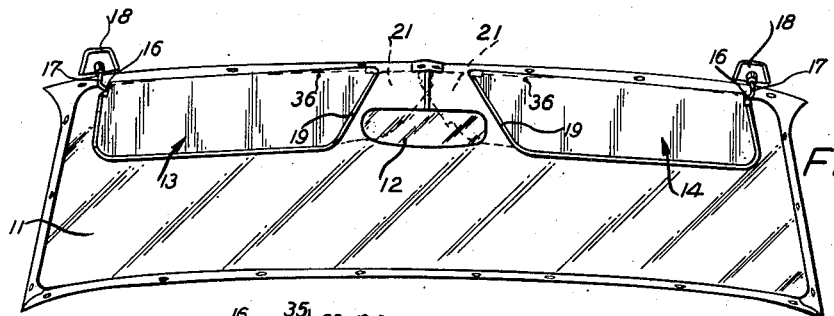
FIG. 1
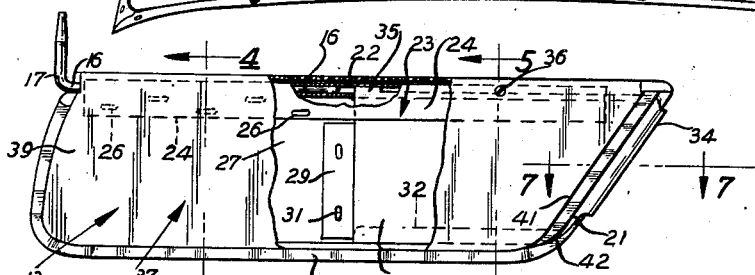
FIG. 2
FIG. 3
FIG. 4  FIG. 5
FIG. 6
FIG. 7
R. J. McCARTHY
M. E. SIEGERT
INVENTORS
BY E. C. McRae
J. L. Faulkner
D. H. Oster
ATTORNEYS Patented Jan. 26, 1954

2,667,222

UNITED STATES PATENT OFFICE 2,667,222

EXTENSIBLE VISOR FOR MOTOR VEHICLES

Russell J. McCarthy, Detroit, and Milton E. Siegert, Plymouth, Mich., assignors to Ford Motor Company, Dearborn, Mich., a corporation of Delaware Application October 9, 1952, Serial No. 313,928

4 Claims. (Cl. 160—211)

This invention relates generally to motor vehicle visors and more particularly to an inside adjustable sun visor for a motor vehicle.

An object of the present invention is to provide an extensible interior sun visor for a motor vehicle in which the visor is provided with a slideable extension which may be operated to increase the overall length of the visor. Motor vehicles are conventionally provided with a pair of interior sun visors which, when positioned adjacent the windshield, are spaced apart a considerable distance at their adjacent ends to provide clearance for the rear view mirror mounted in a central location near the upper part of the windshield. The area of the windshield adjacent the rear view mirror is thus unshielded and in many instances this can be extremely annoying to the driver and/or passengers in the front seat. The present invention provides, for each visor, a readily operated extension which can be housed within the body of the visor when not in use yet which when extended elongates the visor and covers the otherwise unshielded portion of the windshield adjacent the rear view mirror. The extensions on the two visors can be arranged to overlap the rear view mirror and to slide into the space between the mirror and the windshield. Consequently, the required shielding is obtained without interfering with the functioning of the mirror.

A further object of the present invention is to provide an extensible sun visor of the type mentioned above which is simple in construction and economical to manufacture and which does not detract from the appearance or styling of the visor.

Other objects and advantages of this invention will be made more apparent as this description proceeds, particularly when considered in connection with the accompanying drawings, wherein:

Figure 1 is an elevational view looking toward the windshield of a motor vehicle from the interior thereof, and illustrating a pair of sun visors incorporating the present invention.

Figure 2 is an enlarged elevational view, partly broken away, of one of the sun visors shown in Figure 1.

Figure 3 is an elevational view similar to Figure 2 but showing the visor extension in its extended position.

Figures 4 and 5 are enlarged vertical cross-sectional views taken substantially on the planes indicated by the lines 4—4 and 5—5 of Figure 2.

Figures 6 and 7 are enlarged horizontal cross-sectional views taken substantially on the planes by the lines 6—6 and 7—7 of Figures 3 and 2 respectively.

Referring now to the drawings, and particularly to Figure 1, the reference character 11 indicates the windshield of a motor vehicle as viewed from the interior of the vehicle body. The windshield is of the one-piece curved type, and a rear view mirror 12 is conventionally mounted centrally of the windshield near the upper portion thereof, being supported by means of a bracket secured to the moulding above the windshield. A pair of sun visors 13 and 14 are shown, and these visors are conventionally rotatably mounted upon supporting rods 16, the upwardly bent ends 17 of which are pivotally mounted in brackets 18 secured to the vehicle roof. The visors are shown in their lowered positions adjacent the windshield, but may be swung upwardly about the horizontal portions of the rods 16 to inoperative positions adjacent the roof panel, and may also be swung about the end portions 17 of the rods to positions adjacent the side windows of the vehicle. It will be noted that the inner ends 19 of the visors 13 and 14 are necessarily spaced a considerable distance from each other so as to provide clearance for the rear view mirror 12. This space is adapted to be substantially closed by means of sliding extensions 21 carried by the visors and each adapted to be pulled out from the interior of its visor body to increase the overall length thereof. With the visors 13 and 14 in their positions adjacent the windshield, the extensions 21 can be slid into the space between the rear view mirror 12 and the windshield so as to shield the latter without interfering with the function of the rear view mirror.

Reference is now made to Figures 2 to 7 inclusive for a more detailed description of the construction of the visors. Inasmuch as the visors 13 and 14 are identical except for being reversed, only the left hand visor 13 will be described.

The horizontal arm of the supporting rod 16 extends approximately half the width of the visor and is frictionally received within the cylindrical upper portion 22 of a metal hinge member 23. The frictional engagement between the rod 16 and the cylindrical portion 22 of the hinge member permits the visor to be swung about the axis of the rod 16 yet enables the visor to be retained in any adjusted position.

As best seen in Figures 2 and 4, the hinge member 23 is formed with a flat flange 24, the latter being secured by means of wire staples 26 to the upper portion of the visor frame 27. The frame 27 may be formed of fibreboard or a pressed wood board and extends from the left hand end of the visor to approximately the center thereof. A sheet metal extension guide 28 forms a continuation of the visor frame 27 and extends from the center of the visor to substantially the right hand end thereof. The upper portion of the extension guide 28 is spot welded to the flange 24 of the hinge member 23.

The left hand end of the extension guide 28 is formed with an offset flange 29 overlapping the adjacent edge of the visor frame 27, and secured thereto by wire staples 31. The lower edge of the body portion of the extension guide 28 is formed with a return bent flange 32 extending parallel to and spaced from the body portion of the extension guide 28.

Adjacent the upper portion of the metal extension guide 28 the shape of the hinge member 23 is changed somewhat from the shape of the cylindrical portion 22 adjacent the visor frame 27. This construction is best seen in Figure 5, and it will be noted that the marginal edge 33 of the cylindrical portion 22 of the hinge member 2 is spaced from the flange 24 of the hinge member to form a guideway therebetween. The width of this guideway is substantially the width of the guideway formed at the lower portion of the extension guide 28 between the body portion thereof and the return bent flange 32.

From the foregoing it will be seen that aligned guideways are formed adjacent the upper and lower edges of the visor, with the lower guideway being formed between the body portion of the extension guide 28 and the return bent flange 32 thereof, and with the upper guideway being formed between the upper portion of the extension guide 28 and the marginal edge 33 of the hinge member 23. These aligned guideways are adapted to slideably receive the visor extension 21. While the extension 21 may be formed of any suitable material, it has been found that a colored plastic extension is suitable. If desired, the visor extension can be a tinted translucent plastic to function as a filter, or it can be an opaque solid color plastic.

The visor extension 21 corresponds in shape generally to the shape of the extension guide 28, but is formed at its right hand edge with a rolled tab or flange 34 adapted to form a hand hold to enable the visor extension to be pulled out of the visor. The visor extension 21 is also formed at its left hand end with an upstanding lug or stop portion 35 which is adapted to cooperate with a stop screw 36. The stop screw 36 is a self tapping headed screw carried by a cylindrical portion 22 of the hinge member 23 in alignment with the flange 35 of the visor extension. The location of the stop screw 36 determines the travel of the visor extension and forms a positive stop limiting the movement of the visor extension relative to the visor.

Covering the visor is a U-shaped cover 37 which may be formed of cardboard or a fabric covered board to form a protective and decorative support for the visor structure. A binding 38 embraces the left hand and lower edges of the visor cover 37 and is stitched thereto. At the right hand edge of the visor, the two sides 39 and 40 of the visor cover are not connected to each other by the binding, but are separated to provide space therebetween for the sliding movement of the visor extension 21. Upon reference to Figures 2 and 7, it will be seen that the side 39 of the visor cover which is adjacent the driver when the visor is in position next to the windshield is somewhat shorter than the opposite side 40 thereof. A binding 41 embraces the right edge of the short side 39 of the visor cover while a similar binding 42 embraces the right hand edge of the longer side 40 of the cover, each of the bindings being stitched to their respective side of the cover. The binding 42 may be a continuation of the binding 38 along the bottom of the visor.

This arrangement exposes a narrow portion of the visor extension 21 adjacent the marginal flange 34 when the visor is in its operative position adjacent the windshield, thus facilitating the grasping of the flange 34 to pull the visor extension out of the visor. When the visor is swung to its upper position adjacent the roof panel of the vehicle, however, the longer side 40 of the visor cover conceals substantially all of the visor extension 21. Thus, when the visor is not in use, its appearance is substantially the same as that of a conventional nonextensible visor.

It will be understood that the invention is not to be limited to the exact construction shown and described, but that various changes and modifications may be made without departing from the spirit and scope of the invention, as defined in the appended claims.

What is claimed is:

1. An extensible visor for a motor vehicle adapted to be positioned adjacent the interior side of the vehicle windshield, comprising a hinge member extending substantially the entire length of the visor, a frame secured to said hinge member and extending from one end of the visor to an intermediate portion thereof, a sheet metal guide secured to said frame and forming a continuation thereof from the end of said frame to the opposite end of said visor, said guide having an elongated guideway formed at the lower edge thereof and an aligned guideway adjacent the upper edge thereof between said guide and a portion of said hinge member, and a visor extension slideable in said two guideways from a position adjacent said guide member to a position extending beyond the end of said guide member, and a cover member surrounding said hinge member, frame member, and guide member.

2. The structure defined by claim 1 which is further characterized in that said visor extension is formed with a projecting shoulder adjacent the hinge member, and a stop pin is mounted on the hinge member in alignment with said shoulder to limit movement of said extension relative to said interconnected hinge frame and guide members.

3. The structure defined by claim 1 which is further characterized in that said hinge member comprises an elongated flat flange connected to the upper edges of said frame and guide members, said hinge member adjacent said frame member having a cylindrical portion for receiving a hinge pin, and said hinge member adjacent the upper edge of said guide member having a return bent marginal flange spaced from the flat flange of said hinge member to form a guideway therebetween for said visor extension.

4. The structure defined by claim 1 which is further characterized in that the cover member is generally U-shaped with the base thereof adjacent said hinge member and with the opposite side walls thereof embracing the frame and guide members of the visor, a binding embracing the adjacent edges of the side walls of the cover member along the end and one side of the visor, and separate bindings for each side wall of the cover member adjacent the other end of the visor to form a space therebetween for the projection of said visor extension therethrough.

RUSSELL J. McCARTHY.
MILTON E. SIEGERT.

References Cited in the file of this patent

UNITED STATES PATENTS

| Number | Name | Date |
|---|---|---|
| 2,107,247 | Johnson | Feb. 1, 1938 |
| 2,120,892 | Francis | June 14, 1938 |
| 2,294,317 | Pelcher et al. | Aug. 25, 1942 |
| 2,385,557 | Ward | Sept. 25, 1945 |
| 2,596,873 | Solmes | May 13, 1952 |
| 2,603,530 | Jones | July 15, 1952 |